Jan. 24, 1967　　　　D. ARONSON ETAL　　　　3,299,667
SOLUTION COOLER FOR AN ABSORPTION REFRIGERATION SYSTEM
Filed Dec. 10, 1965　　　　　　　　　　　　　　2 Sheets-Sheet 1

DAVID ARONSON
BRADFORD F. HARRIS
　　　INVENTORS

BY Daniel H. Bobis
　　　　Atty

DAVID ARONSON
BRADFORD F. HARRIS
INVENTORS

BY Daniel H. Bobis
Atty

United States Patent Office 3,299,667
Patented Jan. 24, 1967

3,299,667
SOLUTION COOLER FOR AN ABSORPTION
REFRIGERATION SYSTEM
David Aronson, Upper Montclair, and Bradford F. Harris, Murray Hill, N.J., assignors to Worthington Corporation, Harrison, N.J., a corporation of Delaware
Filed Dec. 10, 1965, Ser. No. 512,989
6 Claims. (Cl. 62—476)

This invention relates to an absorption refrigeration system. More particularly, this invention relates to a solution cooler for an absorption refrigeration system. Still more particularly, this invention relates to an evaporative cooler in which liquid refrigerant is partially evaporated by passing in indirect heat exchange relation with concentrated absorbent solution whereby the concentrated absorbent solution is cooled to a lower temperature.

Solutions used for absorbing liquids or vapors have to be re-concentrated if continuous operation is to be maintained. Generally such reconcentration is done by means of evaporation of the absorbed component, usually at a temperature elevated as respects the temperature at which absorption takes place. In order to conserve the heat required for such reconcentration, the fluid returning from the concentrator (generator) exchanges heat with the fluid entering the concentrator, so as to pre-heat the feed and cool down the concentrated solution at least part of the way towards the temperature at which the subsequent absorption operation can be most effectively run. If the concentrated solution is only partially cooled to such absorption operating temperature, then it will enter at an elevated temperature, requiring the removal of additional heat above and beyond that associated with the absorption process itself. In the prior art the excess heat of the hot concentrated solution has been removed in the absorber, thus requiring a larger than otherwise necessary cooling means to be disposed therein. The removal of this excess heat in the absorber is expensive in terms of equipment and adds to the complexity of the system, while increasing the size of the absorber and the individual component thereof.

Accordingly, it is the object of the present invention to provide a novel solution cooler for an absorption refrigeration system which overcomes the prior art disadvantages; which is simple, reliable and economical; which utilizes an evaporative cooler to remove heat from the concentrated absorbent solution so that it may enter the absorber at the absorber operating temperature; which permits the cooling capacity of the absorber to be reduced to an amount only necessary to remove the heat generated from the absorption taking place therein; which increases the condensate forming capacity of the condenser sufficiently to provide enough liquid refrigerant to the evaporative cooler to reduce the temperature of the concentrated absorbent solution passing therethrough to that of the substantial operating level of the absorber; which evaporative cooler may be selectively positioned to effect the desired cooling of the concentrated solution.

Another object of this invention is to provide a novel solution cooler for an absorption refrigeration system in which the liquid refrigerant from the condenser is thermally circulated to the evaporative cooler wherein after it is gravity fed it will be partially evaporated and the mixture of vapor and entrained droplets return to the condenser by the thermo siphon effect of percolation for recondensing therein; which would alternately permit the condensate to be force fed to the evaporative cooler for passage therethrough in indirect heat exchange relation with the concentrated absorbent solution; which aids in preventing crystallization of the absorbent solution on shut down by removal of the cooling liquid refrigerant from the evaporative cooler.

This invention is concerned with a simple and effective means for removing heat from the hot concentrated absorbent solution, while employing the usual components of the absorption refrigeration system and requiring an increase in the condensate forming capacity of the condenser. In one embodiment of the invention a portion of the liquid refrigerant may be thermally circulated to the evaporative cooler wherein the condensate will boil and remove heat from the concentrated absorbent solution prior to the concentrated solution being returned to the absorber. Alternately the liquid refrigerant may be force fed to the evaporative cooler.

Other objects and advantages will be apparent from the following description of several embodiments of the invention and the novel features will be particularly pointed out hereinafter in the claims; reference being had to the accompanying drawings forming a part of this specification wherein like reference characters designate corresponding parts in the several views. Furthermore, the phraseology or terminology employed herein is for purpose of description and not of limitation.

Figure 1:
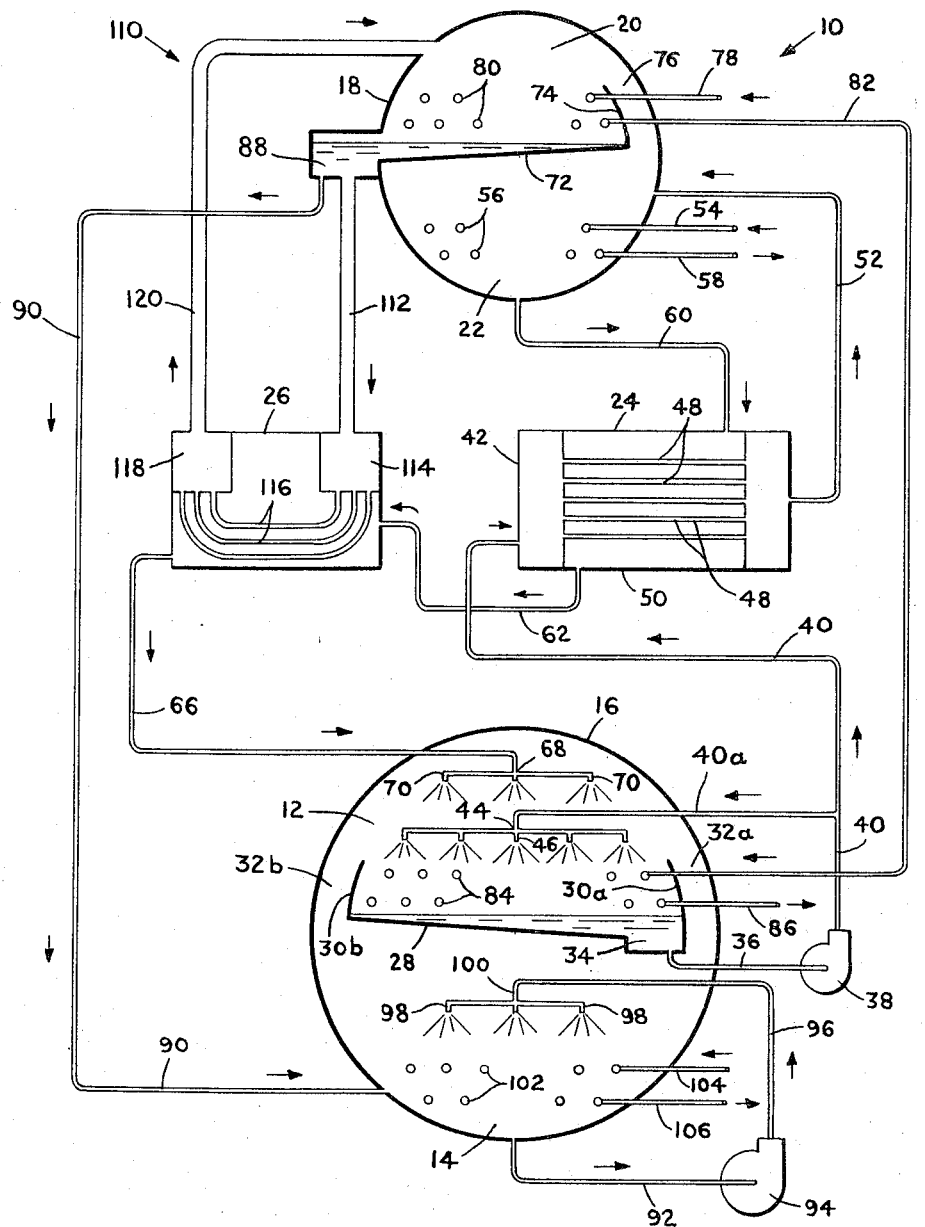
FIGURE 1 is a diagrammatic illustration of an absorption refrigeration system embodying the present invention.

In the embodiment of the invention shown in FIGURE 1 the novel solution cooler is incorporated in an absorption refrigeration system, designated generally as 10.

The absorption refrigeration system illustrated diagrammatically in FIGURE 1 contains an absorbent solution which is circulated therein in varying concentrations. The absorbent solution may consist of a suitable brine or salt, such as lithium bromide, and a refrigerant, such as water. The absorbent solution in the system is referred to as a weak solution whenever it contains a quantity of refrigerant such that the solution is rendered weak in absorbing properties. A weak solution will generally consist of between 55% to 62% lithium bromide. The absorbent solution in the system is referred to as a concentrated solution whenever the quantity of refrigerant contained in such solution is deficient so as to enhance the refrigerant absorption properties of said solution. A concentrated solution will generally consist of between 66% to 69% lithium bromide.

Absorption refrigeration system 10, as shown in FIGURE 1, includes an absorber 12 and an evaporator 14 formed in a low pressure longitudinally extending shell 16. A high pressure longitudinally extending shell 18 is disposed above the shell 16 and has formed therein a condenser 20 and a generator 22. A heat exchanger 24 and an evaporative cooler 26 may be conveniently positioned between shells 16 and 18 for purposes more fully described hereinafter.

Shell 16 has a partition 28 extending therethrough to separate absorber 12 from evaporator 14. Partition 28 has upturned edges 30a and 30b formed at its sides to define passages 32a and 32b formed between the upturned edges 30a and 30b, respectively, and the wall of shell 16. A sump 34 is formed adjacent to edge 30a for collecting the weak solution in absorber 12.

The weak solution from sump 34 is delivered in line 36 to pump 38 which discharges it into line 40 connected to the tube side 42 of heat exchanger 24. Branch line 40a has a portion of the weak solution in line 40 passed therethrough to spray header 44 disposed in absorber 12, from which the weak solution is discharged from nozzles 46 for recirculation in absorber 12.

Tube side 42 of heat exchanger 24 has a plurality of tubes 48 extending through the shell side 50 of heat exchanger 24. The weak solution is delivered in line 40 to the tube side 42 to pass in tubes 48 in indirect heat exchange relation with the concentrated solution in the shell side 50 of heat exchanger 24. The pre-heated weak solution is discharged from tube side 42 of heat exchanger 24 into line 52 from which it enters generator 22. Although the absorber 12 is maintained at a pressure of about 0.3 inch of mercury, pump 38 will supply sufficient energy to the weak solution to insure its delivery to generator 22 which is maintained at a pressure of about 3.0 inches of mercury.

In generator 22 refrigerant vapors are boiled from the weak solution for purposes of concentrating the latter. Heat is supplied from a suitable source, such as low pressure steam at 15 p.s.i.a. (not shown) to generator 22 through line 54 which connects into tube bundle 56. The steam or its condensate is discharged from tube bundle 56 into line 58. The weak solution entering generator 22 will pass in indirect heat exchange relation with the steam or its condensate and be caused to boil. The refrigerant vapor driven from the boiling solution will pass upwardly towards the condenser 20. The hot concentrated solution will pass out of generator 22 through line 60 to enter shell side 50 of heat exchanger 24, wherein the hot concentrated solution will be somewhat cooled while pre-heating the weak solution going to the generator 22. The concentrated solution will be discharged from shell side 50 into line 62 which is connected to an evaporative cooler 26. The concentrated solution will be further cooled in evaporative cooler 26, as more fully described hereinafter, whereby on discharge from cooler 26 the concentrated solution will be a temperature substantially equal to the operating temperature of absorber 12. Line 66 is connected to evaporative cooler 64 and delivers the cooled concentrated solution to spray header 68 disposed in absorber 12 from which it will be discharged through nozzles 70 to commingle with the weak solution being discharged from spray header 44. The flow of the concentrated solution from generator 22 to absorber 12 occurs because of the pressure differential therebetween and is also influenced by gravity.

Condenser 20 is formed in shell 18 by transverse partition 72 which has one end connected to shell 18 and the other end 74 extending upwardly therefrom to form a passage 76 through which the refrigerant vapor from generator 22 will enter condenser 20. Cooling water is delivered to condenser 20 from a suitable source (not shown) through line 78 connected to tube bundle 80. The cooling water passes from tube bundle 80 into line 82 which may deliver it to tube bundle 84 disposed within absorber 12 from which it will be discharged through line 86.

The refrigerant vapor entering condenser 20 will come in contact with condenser tube bundle 80 and be cooled and condensed thereby. The refrigerant condensate will accumulate along the bottom of the condenser and be collected in sump 88 which is shown externally of shell 18 but may be disposed internally thereof. A portion of the condensate in sump 88 will be gravity fed in line 90 to evaporator 14.

The refrigerant condensate on entering evaporator 14 will have a portion thereof flash and the remainder will be collected at the bottom of evaporator 14. The liquid refrigerant at the bottom of evaporator 14 will be drawn off in line 92 by the suction of refrigerant pump 94, which will deliver the liquid in line 96 for discharge through nozzles 98 of spray header 100. The sprayed liquid refrigerant passes over cooling chiller tubes 102 in which the water is chilled and the refrigerant evaporated on the surface of tubes 102, thereby taking heat from the water circulating in tubes 102 and chilling it. Liquid to be cooled in evaporator 14 is introduced by line 104 into cooling chiller tubes 102 in which it is cooled prior to discharge therefrom in line 106.

The vaporized refrigerant entering absorber 12 through passages 32a and 32b will be absorbed into the combination of sprayed solutions through the absorption process on contact with the solution. Tube bundle 84 serves to cool the solution and remove the heat liberated to the solution when the refrigerant vapor is absorbed. Sufficient refrigerant vapor is absorbed by the sprayed solution so as to collect in sump 34 in the form of weak solution.

A thermal loop, designated generally as 110, delivers and returns condensate from cooler 26. This loop 110 originates in sump 88 of condenser 20 from which liquid refrigerant is delivered in line 112 to evaporative cooler 26 wherein it enters header 114 for distribution to tubes 116. In tubes 116 the liquid refrigerant will be partially evaporated and the mixture of vapor and entrained droplets will be collected in discharge header 118 from which it will be carried into line 120 for return to condenser 20 wherein the vapor will itself be cooled and condensed for return with the liquid droplets to the sump 88 of condenser 20.

Thus, the invention, shown in absorption refrigeration system of FIGURE 1, calls for thermal circulation of the liquid refrigerant passing through cooler 26. After its gravity feed into evaporative cooler 26 the condensate will boil and be partially evaporated in the U-shaped tubes 116 causing a percolator effect or bubbling which returns the mixture of vapor and entrained droplets in line 120 to condenser 20 to complete the thermal circuit.

The present invention by increasing the load or condensate forming capacity of condenser 20 by an amount sufficient to meet the liquid refrigerant requirements of evaporative cooler 26 is able to reduce the cooling usually required in absorber 12 by an amount substantially equal to the increased cooling accomplished in condenser 20. This is possible because the concentrated solution is cooled to the substantial operating temperature of the absorber 12 externally thereof in the evaporative cooler 26. The reduction of cooling capacity of absorber 12 results in a more economical and effective arrangement because of the likelihood of higher temperature differences and better heat transfer coefficients in the system.

Figure 2:
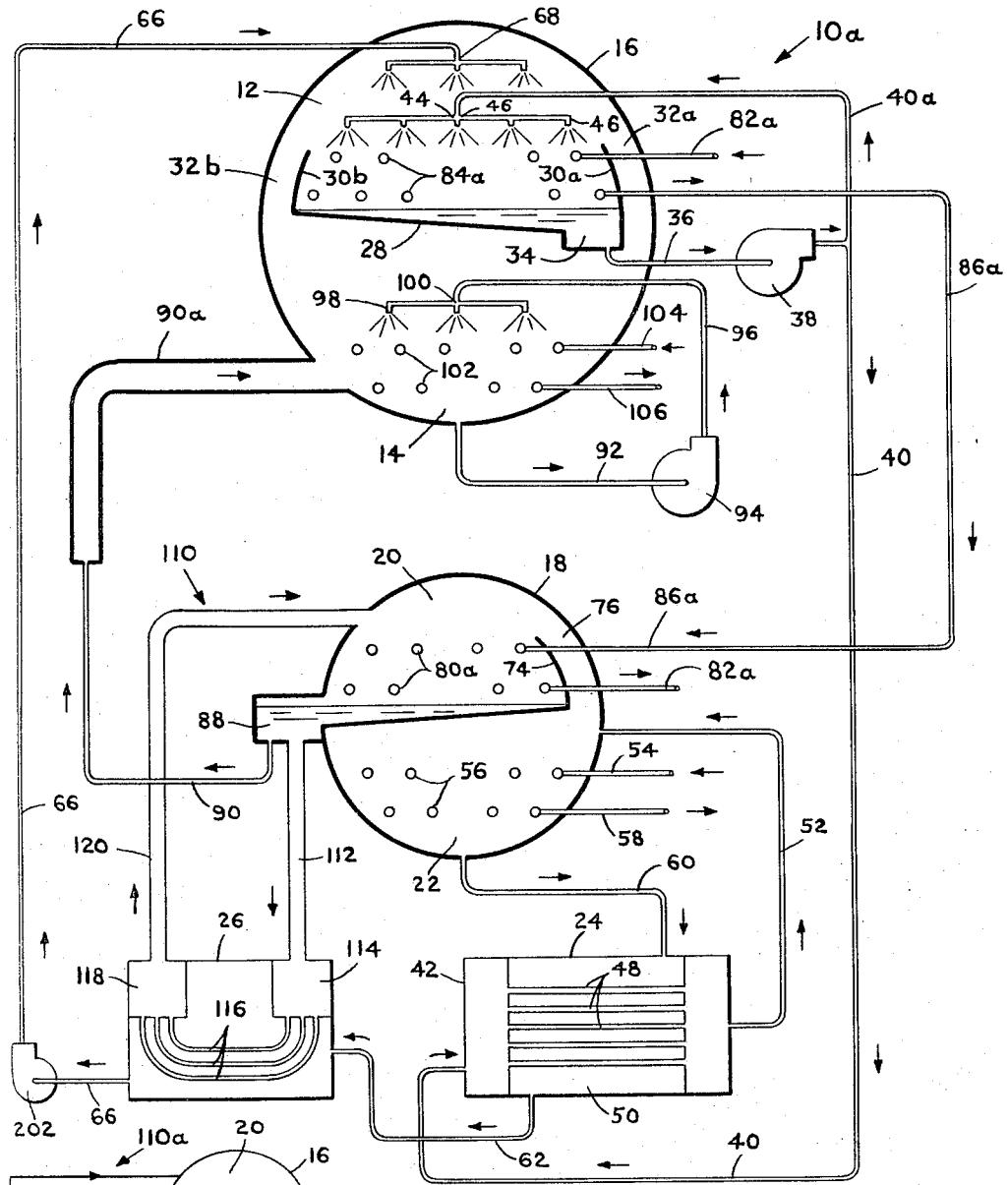
FIGURE 2 is a diagrammatic illustration of another absorption refrigeration system embodying the present invention.

In the embodiment of the invention as shown in FIGURE 2 the novel solution cooler is incorporated in an absorption refrigeration system designated generally as 10a.

Absorption refrigeration system 10a is illustrated diagrammatically in FIGURE 2 and except for the changes necessitated by placing low pressure shell 16 in superposition to high pressure shell 18, system 10a will be the same in operation and structure as was described hereinbefore under system 10.

The refrigerant condensate collected in sump 88 of condenser 20 will have a portion thereof delivered by force of the existing pressure differential existing between shells 16 and 18 which will permit passage of the liquid refrigerant through line 90 and associated enlarged section 90a to evaporator 14 wherein a portion of the condensate will flash and a remainder of the condensate will be collected at the bottom of evaporator 14 similar to that described hereinbefore.

A pump 202 has been added in line 66 to insure the delivery of the concentrated solution from generator 22 to spray header 68 disposed in absorber 12.

Thermal loop 110 will function substantially similar to that described hereinbefore under FIGURE 1.

In system 10a the cooling water will be delivered to absorber 12 in line 82a to tube bundle 84a disposed therein. The cooling water will be discharged in line 86a which passes it to tube bundle 80a disposed in condenser 20. Line 82a connects to tube bundle 80a and receives the discharged cooling water which may be recycled to suitable equipment (not shown) or discharged to waste.

Except for the differences already noted absorber 12, evaporator 14, condenser 20, generator 22, heat exchanger 24, evaporative cooler 26 and the associated lines and pumps are interconnected to form absorption refrigeration systems 10a in a closed operative refrigeration loop which will be understood to operate in a manner substantially similar to that described hereinbefore under system 10 of FIGURE 1.

Figure 3:
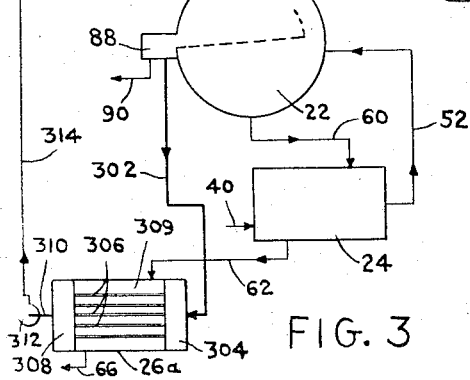
FIGURE 3 is a diagrammatic illustration of a partial system embodying a force fed version of the present invention.

In the embodiment of the invention shown in FIGURE 3 the novel solution cooler is shown having a force feed circulation loop 110a.

The embodiment of FIGURE 3 may be used with any system, as for example absorption refrigeration systems 10 or 10a. A high pressure shell 16 will house condenser 20 and generator 22. Weak solution from the system will enter heat exchanger 24 in line 40 and pass in indirect heat exchange relation with concentrated solution therein prior to being discharged into line 52 for delivery to generator 22. Concentrated solution from generator 22 passes in line 60 into heat exchanger 24 for preliminary cooling therein and discharged in line 62 for delivery to cooler 26a which may be of the shell and tube type of similar construction as that of heat exchanger 24 or any other suitable construction.

A portion of the liquid refrigerant will be delivered in line 90 to the evaporator (not shown). Another portion of the liquid refrigerant in sump 88 of condenser 20 will pass into line 302 to tube side header 304 of cooler 26a for distribution to a plurality of tubes 306 wherein the condensate passing in indirect heat exchange relation with the concentrated solution may be partially evaporated prior to being drawn into discharge header 308 from which it will pass in line 310 into the suction of pump 312 to be discharged in line 314 for return to condenser 20.

The force feed circulation loop 110a permits greater flexibility in the location of cooler 26a so as not to restrict the respective elevation of the condenser 20 and cooler or associated components. Thus the cooler 26a may be positioned above, below or to either side of condenser 20.

The concentrated solution passing through the shell side 309 of cooler 26a will be reduced in temperature so as to be at the approximate temperature of the absorber (not shown) to which it will be delivered in line 66.

Once again the cooling capacity of the condenser 20 will be increased by an amount approximately equal to the reduction of cooling capacity in the absorber (not shown).

If the concentrated solution were not cooled down in the cooler 26a to the absorption operating temperature, then it would have entered the absorber at an elevated temperature, requiring the removal of additional heat above and beyond that associated with the absorption process itself. This is very undesirable because the heat removal in the absorber is likely to be expensive and less efficient. The present invention permits the removal of the heat from the hot concentrated solution externally of the absorber, in the cooler 26a prior to introducing the concentrated solution into the absorber.

On shutdown of the absorption refrigeration system the liquid refrigerant will be drained from the evaporative cooler 26 or 26a by means not shown, so as to prevent crystallization of the concentrated solution.

Suitable control means (not shown) may be utilized in the absorption refrigeration system to regulate the capacity thereof.

Suitable purge means (not shown) may be utilized in the absorption refrigeration system to remove non-condensibles from the refrigerant.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. An absorption refrigeration system in which an absorbent solution in varying concentration and a refrigerant are circulated comprising:
   (a) a generator concentrating the absorbent solution and passing off vaporous refrigerant,
   (b) an absorber receiving absorbent solution from the generator and returning dilute absorbent solution thereto,
   (c) a condenser receiving vaporous refrigerant from the generator and condensing it therein,
   (d) an evaporator receiving a portion of the condensed refrigerant for circulation therein and passing the evaporated refrigerant to the absorber for absorption in the absorbent solution,
   (e) a cooler means disposed below the condenser and having the concentrated solution from the generator passing therethrough, and receiving by gravity flow a portion of the liquid refrigerant to pass in indirect heat exchange relation with the concentrated solution to be partially evaporated in said cooler to establish a thermal loop to return the partially evaporated refrigerant to the condenser as a mixture of vapor and entrained liquid droplets.

2. The combination claimed in claim 1 wherein:
   (a) the cooler means disposed adjacent the condenser,
   (b) conduit means connected to the condenser to circulate a portion of the liquid refrigerant therein through the cooler wherein the condensate will pass in indirect heat exchange relation with the concentrated absorbent solution to cool the same.
   (c) a pumping means disposed in the conduit means to energize the liquid refrigerant delivered from the condenser to the cooler means and permit its return from the cooler means to the condenser.

3. The combination claimed in claim 1 wherein:
   (a) a source of heat disposed in the generator to boil the absorbent solution,
   (b) a cooling tube bundle disposed in the absorber to remove heat generated therein by the absorption process,
   (c) a cooling tube bundle disposed in the condenser to remove heat from the vaporous refrigerant thus causing condensation thereof,
   (d) the condenser cooling tube bundle having the capacity thereof increased by a predetermined amount in order to insure the supply of liquid refrigerant to the cooler means,
   (e) the absorber cooling tube bundle having the capacity thereof decreased by a predetermined amount in a substantially direct proportion to the increased capacity of the condenser.

4. The combination claimed in claim 1 wherein:
   (a) the cooler means has a predetermined capacity of heat transfer for the liquid refrigerant passing therein in indirect heat exchange relation with the concentrated absorbent solution, whereby the absorbent solution may be cooled to not less than the operating temperature of the absorber,
   (b) the condenser having an increased condensate forming capacity at least equal to the predetermined capacity of the cooler means,
   (c) the evaporator having a decreased cooling capacity corresponding to the quantity of heat removed from the concentrated absorbent solution in the cooler means.

5. The combination claimed in claim 4 wherein:
   (a) a heat exchanger disposed between the generator and absorber to pass the absorbent solution from each in indirect heat exchange relationship to the other,
   (b) the cooler means defining an evaporative cooler and disposed between the heat exchanger and the absorber to receive and cool the concentrated absorbent solution from the heat exchanger prior to its entering the absorber.

6. The combination claimed in claim 5 wherein:
(a) the evaporative cooler having a predetermined capacity for the liquid refrigerant passing therein in indirect heat exchange relation with the absorbent solution from the heat exchanger whereby the absorbent solution will be cooled to not less than the operating temperature of the absorber,
(b) the condenser having its normal condensate forming capacity increased by an amount substantially equal to the predetermined capacity for condensate of the evaporative cooler,
(c) the absorber having its normal cooling capacity decreased by an amount substantially equal to the amount of heat removed from the concentrated absorbent solution in the evaporative cooler.

References Cited by the Examiner
UNITED STATES PATENTS

| | | | |
|---|---|---|---|
| 1,702,754 | 2/1929 | Wessblad | 62—489 X |
| 2,279,017 | 4/1942 | Ullstrand | 62—489 X |
| 2,284,691 | 6/1942 | Strandberg | 62—489 X |
| 2,855,765 | 10/1958 | Smith et al. | 62—485 |

LLOYD L. KING, *Primary Examiner.*